United States Patent [19]

Burkin et al.

[11] 3,875,638

[45] Apr. 8, 1975

[54] MECHANISM FOR FEEDING AND FIXING MAGNETIC CORES IN A DEVICE FOR INTERWEAVING MEMORY MATRICES WITH A COILED WIRE

[76] Inventors: Jury Alexandrovich Burkin, ezd. 29, kv. 24; Jury Emelyanovich Seleznev, 4a, kv. 16, both of Novosibirsk, U.S.S.R.

[22] Filed: Nov. 14, 1973

[21] Appl. No.: 415,888

[30] Foreign Application Priority Data

Dec. 18, 1972 U.S.S.R. .......... 1862919

[52] U.S. Cl. .......... 29/203 MM; 29/240.5; 29/241; 29/433; 29/604; 140/92.7; 140/92.8

[51] Int. Cl. .......... H01f 41/02

[58] Field of Search ....... 29/200 P, 203 P, 203 MM, 29/604, 241, 240.5, 433, 456; 340/174 MA; 140/92.3, 92.4, 92.7, 92.8

[56] References Cited

UNITED STATES PATENTS

| | | | |
|---|---|---|---|
| 3,310,865 | 3/1967 | Schelling | 29/604 |
| 3,529,341 | 9/1970 | Bardo | 29/203 MM |
| 3,584,362 | 6/1971 | Hazel et al. | 29/203 MM |

*Primary Examiner*—Carl E. Hall
*Attorney, Agent, or Firm*—Holman & Stern

[57] ABSTRACT

A mechanism for feeding and fixing magnetic cores in a device for interweaving memory matrices with a coiled wire is made as a shaft assembled from disks having recesses to accommodate therein wire carrying magnetic cores strung in piles thereon. The thickness of a disk equals half the lead of the coil into which the interweaving wire is coiled. Each of the disks has at least one seat to catch magnetic cores.

9 Claims, 13 Drawing Figures

MECHANISM FOR FEEDING AND FIXING MAGNETIC CORES IN A DEVICE FOR INTERWEAVING MEMORY MATRICES WITH A COILED WIRE

BACKGROUND OF THE INVENTION

This invention relates in general to apparatus involved in manufacturing the memory registers of electronic computers and has particular reference to a mechanism for feeding and fixing magnetic cores in a device for interweaving memory matrices with a coiled wire.

The invention is applicable to the piecewise feeding (row-after-row) and fixing in an oriented position of magetic cores of diverse sizes, microminiature ones inclusive, used in interweaving memory matrices and cubes with a coil-wound wire, and features a variety of topological arrangements of magnetic cores at the cross-points of the coordinate wires. The invention is applicable to a mechanized interweaving of memory registers of practically unlimited capacity.

It is known to use heretofore a mechanism for feeding and fixing magnetic cores in a device for interweaving memory matrices with a coiled wire.

Said known device comprises a bed, whereon are fixed at a slight tension the wires arranged in a row, said wires belonging to one coordinate setting and carrying magnetic cores strung in piles thereon. The wires are accommodated in the recesses of the feeder located on the base and made as a shaft.

Said device is provided with a coil-forming mechanism made fast on the bed on the face side of the feeder. The coil-forming mechanism is for coiling the wire interweaving the magnetic cores in the second coordinate setting and is made as a taper bobbin interposed between two blocks.

To provide a possibility of interweaving magnetic cores in the memory matrices featuring mutually perpendicular positioning of the magnetic cores along the lines being interwoven and across the lines, the shaft is made with ring-shaped ridges or collars evenly spread over the shaft length. Arranged in two rows on the ring-shaped ridges and in spaces therebetween are seats to catch magnetic cores. Located in the same plane are the shaft recesses accommodating wires with magnetic cores strung in piles thereon. Spacing between the rows of seats, i.e., the distance from the magnetic-core catching seats located on the annular ridges to those located in the valleys between said ridges, corresponds to the diameter of the interweaving wire coil, whereas the spacing between the seat on the annular ridge and the similar adjacent seat on the annular ridge or similarly, the spacing between two adjacent seats located in the valleys between the annular ridges-- is equal to the lead of the interweaving wire coil.

The coil of the interweaving wire of one hand of winding accounts for a mutually perpendicular positioning of all the adjacent magnetic cores in a matrix line. The coils of the interweaving wire alternating in the direction of winding from line to line, are responsible for the mutually perpendicular positioning of the neighbouring magnetic cores in the adjacent matrix lines.

In the known device the piecewise feeding and fixing of magnetic cores in an oriented position for interweaving with a coiled wire, occur as follows.

The shaft, while rotating, separates the bottom magnetic core from each pile of cores; further shaft rotation arranges the separated magnetic cores in two rows and feeds them to the zone of interweaving in such a manner that the rows of the arranged magnetic cores are spaced spart for a distance corresponding to the coil diameter of the interweaving wire. In each row magnetic cores are spaced equidistantly at an interval equal to the coil lead of the interweaving wire, while the cores of the two rows taken together are offset by half the lead of the interweaving wire coil.

When in such a position, the magnetic cores are interwoven with a wire wound into a coil that is formed in the coil-shaping mechanism. Interweaving is done by rotating the coiled wire and imparting feed motion thereto along the path of the wire coil.

Then the wire wound in a coil and carrying magnetic cores interwoven by it, is removed from the shaft by further rotating of the latter and straightened, thereby forming the line of a matrix. As a result, the magnetic cores arranged in different rows on the shaft occur in the line in the mutually-perpendicular positions.

To attain a mode wherein the magnetic cores located in the adjacent matrix lines be positioned mutually perpendicular, said lines should be formed by wires wound in coils of opposite hands.

However, the known mechanism for feeding and fixing magnetic cores in a device for interweaving memory matrices with a coiled wire suffers from the following disadvantages:

- inability to interweave the memory matrices of more than one topological pattern of magnetic cores in the line being interwoven wherein all the adjacent magnetic cores in the said line are inclined towards one another in mutually perpendicular directions;

- inability to interweave memory matrices with a mutually perpendicular arrangement of all magnetic cores in the adjacent matrix lines other than with the use of two coil-forming mechanisms adapted to wind the interweaving wires into L. H. and R. H. coils;

- difficulties in manufacturing the shaft, and especially the seats for catching magnetic cores, located in the valleys between the annular ridges;

- inability to fit two rows of arrangement of magnetic cores on the shaft for the coil diameter of the interweaving wire.

SUMMARY OF THE INVENTION

It is therefore a primary object of the present invention to provide such a mechanism for feeding and fixing magnetic cores in a device for interwevaving memory matrices with a coiled wire that would be simple in design and convenient in operation and would be capable of making a variety of topological patterns of memory matrices with the use of a single coil-forming mechanism adapted to wind the interweaving wire into the coil of the same hand, and would be simple to adjust and set up.

According to the aforesaid and other objects the essence of the present invention resides in that in a mechanism for feeding and fixing magnetic cores in a device for interweaving memory matrices with a coiled wire, said mechanism being made as a shaft having recesses arranged transversely to its axis and spread along said shaft, which recesses are adapted to accommodate therein the wires with magnetic cores strung in piles thereon, and having seats for magnetic cores to catch, featuring the centers of all magnetic cores arranged in said seats and set for being interwoven with a coiled wire, being coplanar. According to the invention the shaft is composed of a number of recessed disks separate for at least each of said wires, carrying magnetic cores strung in piles thereon. These disks, have a thickness equal to half the lead of the interweaving wire coil and provided with at least one seat for magnetic cores to catch.

It is expedient that the disks be arranged eccentrically to the shaft axis, with an eccentricity towards the magnetic-core catching seats and in amount equal to half the diameter of the wire coil.

It is reasonable that each disk have an additional seat located on the disk side diametrically opposite to said former seat.

It is recommendable that the seats for catching magnetic cores are arranged in the direction of the axis of rotation of said disks.

It is possible that at least one of said diametrically opposed seats on the disk be located at an angle to the axis of rotation of said disk, which angle is equal to the helix angle of the wire coil.

It is favourable that the shaft axis be inclined towards the axis of rotation of each of the disks at an angle corresponding to the helix angle of the wire coil.

It is advantageous that spacers are interposed between some of the disks, the thickness of a spacer corresponding to half the lead of the wire coil.

It is quite practicable that the disks be mounted movably in a direction square with the shaft axis, and a comb be provided in a close proximity to the shaft, the teeth of said comb being arranged oppositely to some predetermined disks to hold them eccentrically with respect to the shaft axis.

Such a mechanism allows of standardizing the device for interweaving memory matrices with a coiled wire and making it suitable for making a variety of topological patterns of memory matrices, simplifies the construction of the mechanism, its setting up and repair and improves performance characteristics. The mechanism enables the performing of topologically different matrices using the coil-forming mechanism with the same wire coil winding hand.

BRIEF DESCRIPTION OF THE DRAWINGS

Other objects and advantageous features of the present invention will have hereinafter been disclosed from a consideration of illustrative embodiments thereof to be read in conjunction with the accompanying drawings, wherein.

DESCRIPTION OF THE PREFERRED EMBODIMENTS

Figure 1:
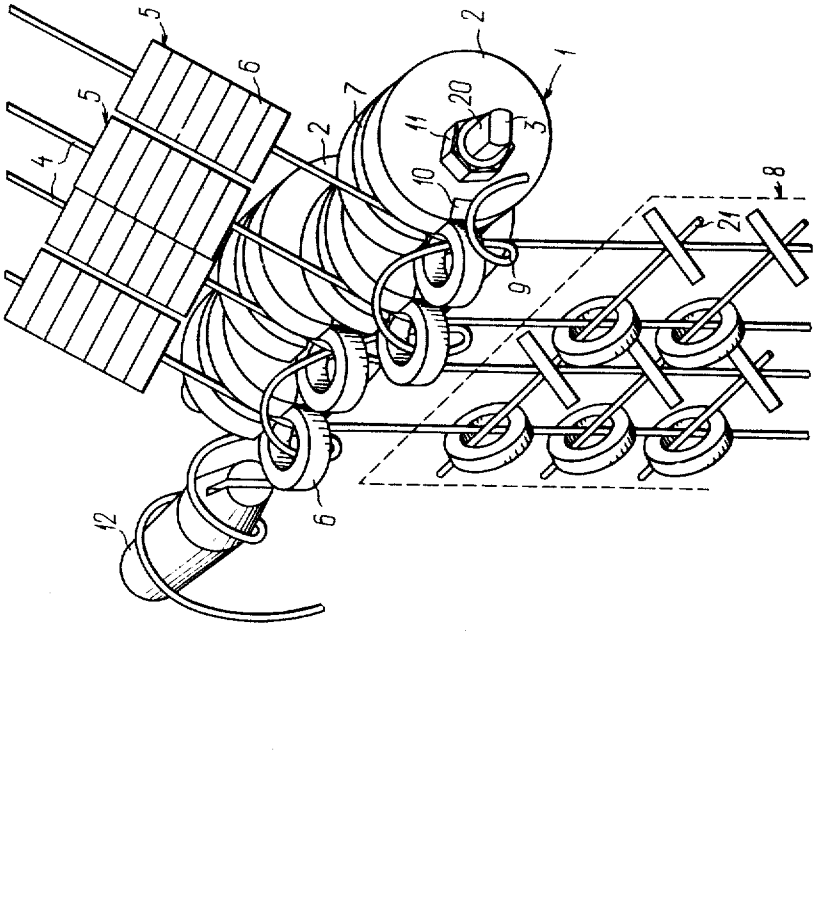
FIG. 1 schematically represents a mechanism for feeding and fixing magnetic cores in a device for interweaving memory matrices with a coiled wire, according to the invention.

Referring now to the accompanying drawings, FIG. 1 shows a shaft 1 of the mechanism for feeding and fixing magnetic cores in a device for interweaving memory matrices with a coiled wire. This shaft is assembled from separate disks 2 fitted on a central rod 3. Spread along the shaft 1 are wires 4 carrying magnetic cores 6 strung in piles 5 thereon. The wires 4 are accommodated in recesses 7 provided in each of the disks 2 and are held with a slight tension on the frame (not shown) of a device for interweaving memory matrices with a coiled wire.

The recesses 7 are made over a cylindrical surface of the disk 2 in the direction perpendicular to the axis of rotation of the disk 2.

Depending upon the predetermined topological pattern of the magnetic cores 6 in a memory matrix 8 being made, the disks 2 are to be interconnected, say, in pairs, and made as an integral piece.

The thickness of the disks 2 corresponds to half the lead of a coil 9 of the interweaving wire. The disks 2 are arranged eccentrically with respect to the central rod 3 of the shaft 1 towards seats 10 for catching the magnetic cores, with the amount of eccentricity being equal to half the diameter of the coil 9 of the interweaving wire. Each disk 2 has at least one seat 10 provided on the cylindrical surface thereof, made as a recess shaped to match the contour of the magnetic core 6, or as a slot arranged across the recess 7. The seats 10 are arranged in two rows parallel to the axis of the shaft 1 and spaced apart by a distance equal to the double amount of eccentricity of the disks 2 which corresponds to the diameter of the coil 9 of the interweaving wire. The disks 2 may be rigidly interconnected by, say, being forced against one another from butt ends by means of nuts 11 fitted over the central rod 3.

The centres of all the magnetic cores 6 accommodated in said seats 10 and arranged for being interwoven with the wire coiled into the coil 9, are coplanar.

The shaft 1 composed of the disks 2 is so positioned in a device for interweaving memory matrices with a coiled wire that a coil forming device 12 of the device is located adjacent the end-face of the shaft 1.

In order that the magnetic cores in the adjacent lines of the memory matrix 8 be arranged in the mutually-perpendicular directions, each disk 2 of the shaft 1 has an additional seat 13 (FIG. 2) located on the side of the disk 2, diametrically opposite to the seat 10. Thanks to this, the shaft 1 is so composed that each of its disks 2 carries the seats 10 and 13 located on the diametrically opposite sides thereof and featuring oppositely directed eccentricity with respect to the axis of the shaft 1.

In a simplest embodiment of the mechanism the seats 10 and 13 in the disk 2 are arranged in the direction of the axis of rotation of the disk 2, i.e., perpendicular to the direction of arrangement of the recess 7 in the disk 2 and, accordingly, with the wire 4 accommodated in said recess 7.

Figure 3:
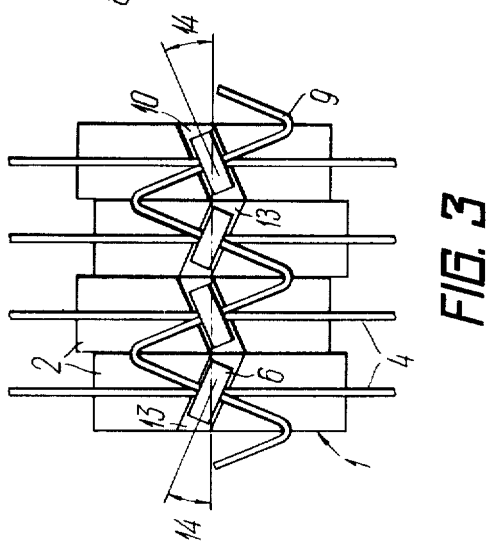
FIG. 3 illustrates another embodiment of the claimed mechanism, wherein the seats are arranged at an angle to the axis of rotation of the disks, according to the invention.

It is expedient, with a view to better exposing the clear area of the hole in the magnetic core 6 placed in the seat 10 or 13, with respect to the wire coiled into the coil 9, that the direction of arrangement of at least one of the diametrically opposite seats 10 or 13 in the disk 2 form an angle 14 (FIG. 3) with the axis of rotation of the disk 2 equal to the helix angle 9 of the interweaving wire. Thereby, the clear area of the hole in the magnetic core 6 gets to a maximum extent exposed towards the direction of movement of the coil 9 of the wire, thus improving the interweaving conditions.

Moreover, both of the seats 10 and 13 are made at the angle 14, equal to the helix angle of the coil 9, relative to the axis of rotation of the disk 2. In such an embodiment, the seat 10 and the additional seat 13 are arranged at the angle 14 transverse to the recess 7 in the disk 2, i.e., the direction of arrangement of the seats 10 and 13 in each disk 2 should lie, as it were, in the same plane passing through the centre of said disk 2 and inclined to its axis of rotation at the angle 14 equal to the helix angle of the coil 9 of the interweaving wire. The shaft 1 is composed of such disks 2 with due allowance for the direction of arrangement of the seat 10 or 13 which should correspond to a definite amount of ecceccentricity of the disk 2 on the central rod 3 of the shaft 1so that a respective half-turn of the coil 9 of the interweaving wire should comply with a definite arrangement of the seat 10 or 13. In this case the clear area of the hole in the magnetic core 6 is exposed to a maximum degree with respect to the both half-turns of the coil 9 of the interweaving wire.

Figure 4:
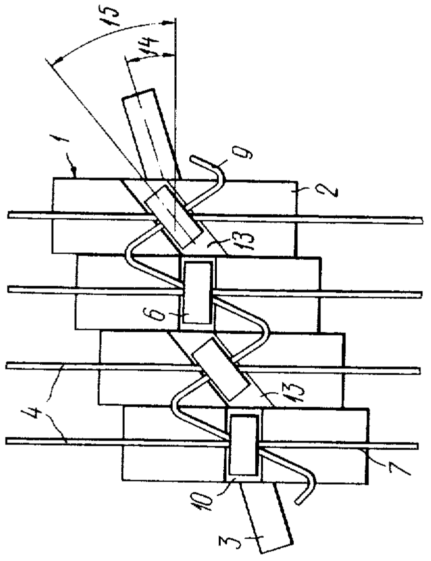
FIG. 4 illustrates still another embodiment of said mechanism, wherein the shaft central rod makes up an angle with the axis of rotation of the disks, according to the invention.

In another embodiment of the mechanism, when one of the seats, say, the seat 10 (FIG. 4) in each disk 2 is arranged in the direction of the axis of rotation thereof, the central rod 3 of the shaft 1 is inclined towards the axis of rotation of each of the disks 2. In this case the additional seat 13 which, as it is shown in the Figure, has an eccentricity away from the central rod 3 of the shaft 1, is situated at an angle 15 to the axis of rotation of the disk 2 corresponding to the double angle of helix of the coil 9 of the interweaving wire. During the interweaving process the coil 9 is so positioned with respect to the shaft 1 that all its half-turns which interweave the magnetic cores in the seats 10, are directed along the recesses 7 in the disks 2 perpendicular to the magnetic core 6, while all the other half-turns thereof intersect the recesses 7 in said disks 2 at the double helix angle of the coil 9 likewise perpendicular to the seat 13 located there and, consequently, to the magnetic core 6 accommodated in said seat 13. The clear area of the holes in the magnetic cores 6 are maximum exposed for the wire coil 9 to interweave.

In a further embodiment of the mechanism under consideration, the latter is enabled to execute such topological patterns of the memory matrices 8 (FIG. 5) in the line thereof being interwoven that feature two or more consecutively arranged magnetic cores 6 inclined obliquely to the same side, while the next two or more magnetic cores 6 are arranged likewise in parallel to one another but inclined obliquely to the other side perpendicular to that of the former cores. To this end, fitted in between some disks 2 preselected in accordance with the required topological pattern of the matrix 8, are spacers 16 whose diameter is somewhat smaller than that of the disks 2, while their thickness equals half the lead of the coil 9 of the interweaving wire. The spacers 16 are placed in between those disks 2 whose cores 6, according to the predetermined topological pattern of the matrix 8 being made, should be inclined in the line to the same side. Diameter of the spacer 16 should be smaller than that of the disk 2 by the value equal to or slightly higher than the amount of eccentricity of the disk 2.

Figure 6:
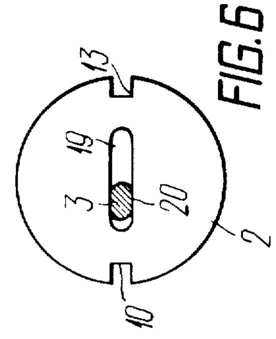
FIG. 6 is an end view of a disk of the claimed mechanism to illustrate the capability of its movement, according to the invention.

The disks 2 are fitted on the central rod 3 so as to be movable in the direction perpendicular to the rod 3 of the shaft 1 along a line establishing an eccentricity. Such a requirement can be fulfilled by virtue of, say, fitting disks 2 on the central rod 3 and so forcing them together by the nuts 11 as to have some movability. The shaft 1 with the disks traversable across it is placed in a close proximity to a comb 17 whose teeth 18 are situated in opposition to those disks 2 which, according to the preset topological pattern of the memory matrix 8 being made, should be arranged eccentrically. By virtue of the tension force exerted by the wires 4 the disks 2 are displaced towards the central rod 3 of the shaft 1, but those disks 2 against which the teeth 18 of the comb 17 are located on the opposite side of the wires 4 are shifted with respect to the central rod 3 of the shaft 1 by the distance equal to the diameter of the coil 9 of the interweaving wire and are kept by said teeth in an eccentric position for the interweaving time. The holes in the disks 2, for such an embodiment of the mechanism, should be made as a guide slot 19 (FIG. 6) which enables the disk 2 to move towards the seats 10, 13.

The central rod 3 of the shaft 1 in all the previously considered embodiments of the mechanism should have longitudinal guides made as, for example, flats 20 to keep the disks 2 against rotation about the central rod 3.

The teeth 18 (FIG. 5) of the comb 17 whose position depends on the pattern of the matrix 8, enable the same feeding and fixing of the magnetic cores 6 in the interweaving process as in all the previously discussed embodiments of the mechanism.

Figure 2:
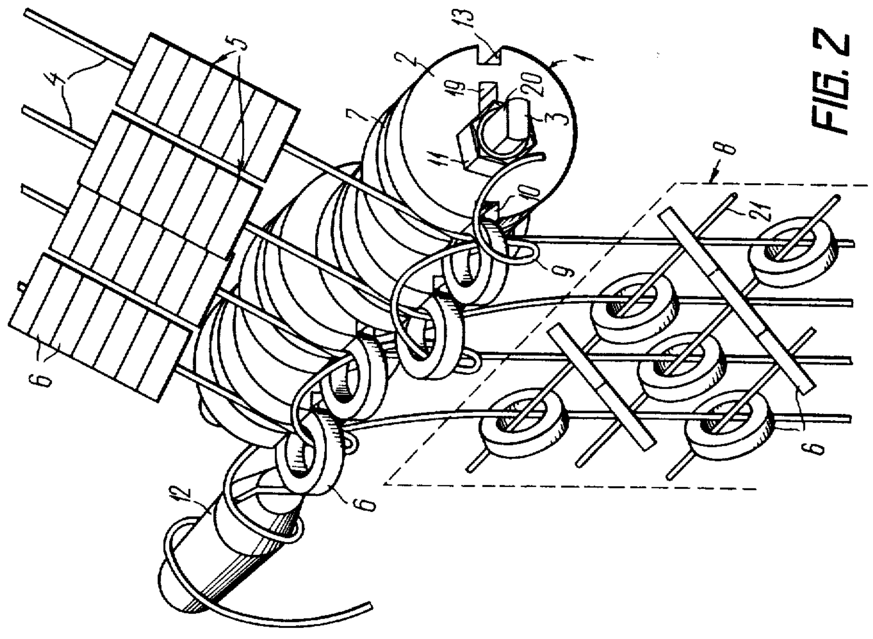
FIG. 2 illustrates an embodiment of the claimed mechanism featuring the disks having additional seats, according to the invention.

Now let us consider the operating principle of the claimed mechanism whose schematic diagram is represented in FIG. 2.

The wires 4 carrying the magnetic cores 6 strung in the piles 5 thereon, envelope the shaft 1 with a slight tension in such manner that the piles 5 of the magnetic cores 6 should be situated above the shaft 1 and each wire 4 be accommodated in its particular recess 7 in the disks 2.

Then the shaft 1 is turned to approach the seats 10 in the disks 2 to the bottom most magnetic cores 6 of the piles 5 so that said magnetic cores should catch the seats 10. Next the shaft 1 is turned in the reverse direction with the result that each seat 10 separates one magnetic core 6 from the respective pile 5; then the magnetic cores 6 thus separated are fed in two rows to the interweaving zone by virtue of the further rotation of the shaft 1. Thereupon, the coil-forming device 12 winds up the coil 9 from the interweaving wire at a lead corresponding to the spacing between the set out magnetic cores 6 and with a diameter equal to spacing between the two rows of the set-out magnetic cores 6. Interweaving is carried out by rotating the coil 9 and feeding it along the helix line of the coil 9 so that the end of the coil 9 (if the latter is left-hand wound as is the case in the drawing) enters successively the holes of the magnetic cores 6 arranged on the disks 2, that are positioned eccentrically towards the coil 9, from below to pierce the cores 6 upwardly from below, whereas the magnetic cores 6 arranged in the other row on the disks 2 that are positioned eccentrically away from the coil 9, are pierced by the end of the coil 9 downwardly from above. It is due to this fact that all the adjacent magnetic cores 6 in the interwoven line of the memory matrix 8 are turned in the mutually perpendicular directions.

Then the wire coiled into the coil 9, and carrying the interwoven cores 6, is kicked out from the shaft 1, let drop down along the wires 4 and is straightened by, say, being stretched into a wire 21 which, as a matter of fact, is the line of the matrix 8.

Further on, the process is repeated. Thus, the so-called "fir-tree" topological pattern (FIG. 8*b*) is made, wherein the adjacent magnetic cores 6 in the line of the matrix 8 are oriented mutually perpendicularly, while the cores in the neighbouring lines are mutually parallel.

In another embodiment of the mechanism, wherein each disk 2 has the additional seat 13 (FIG. 2), the initial line of the matrix 8 is interwoven in same manner as described above, while the next line may be made with the use of the seats 13 of the disks 2 located on the diametrically opposite side of the shaft 1. To this end the shaft 1, after the initial matrix line has been interwoven, is turned through 180°, and separation of the magnetic cores 6 from the piles 5, as well as all further operations involved in making the second line of the matrix 8, are performed in the seats 13 of the disks 2 due to which fact the magnetic cores 6 located in the adjacent lines, are mutually perpendicular. By successively alternating the rows of the seats 10 and 13 located on the diametrically opposite sides of the shaft 1, the so-called "star" topological pattern (FIG. 8*e*) of the memory matrix is made, wherein all the adjacent magnetic cores 6 are mutually perpendicular.

Inasmuch as the seats 10 and 13 of the disks 2, that are arranged eccentrically away from the central rod 3 of the shaft 1, are responsible for the arrangement of the magnetic cores 6 in said seats in a row, which is rather difficult to interweave as compared the other row of the magnetic cores 6 due to the fact that the coil 9 of the interweaving wire has to get, as it were, over the protruding edges of the disks 2 while piercing said magnetic cores 6, it expedient that at least said seats (shown at No. 10 in FIG. 3) be arranged at an angle equal to the helix angle of the coil 9 of the interweaving wire. Thereby the interweaving conditions of the magnetic cores 6 located in both rows of the shaft 1 get somewhat equalized. However, it is much better to arrange the seats 13 in the disks whose magnetic cores 6 are located in a row parallel to the central rod of the shaft 1 at an angle corresponding to the helix angle of the coil 9, but oriented in the opposite direction. This facilitates the interweaving conditions.

Interweaving of the magnetic cores 6 becomes even more convenient in the case where the shaft 1 is positioned at the angle 14 (FIG. 4) to the axis of rotation of the disks 2. When the mechanism operates according to such an embodiment, this best facilitates the conditions for piercing the magnetic cores 6 by the coil 9 of the interweaving wire, as the clear areas of the holes in the magnetic cores 6 are exposed to a maximum in the direction of the movement of the coiled wire 9 and the edges of the disks 2 are protruding due to the eccentricity thereof and to the least extent affect adversely the interweaving process.

The operation of the mechanism incorporating the comb 17 (FIG. 5) will hereinafter be discussed with reference to performing the most typical topological pattern of the memory matrix 8 under consideration (FIG. 8c), viz., the so-called "double fir-tree."

Figure 5:
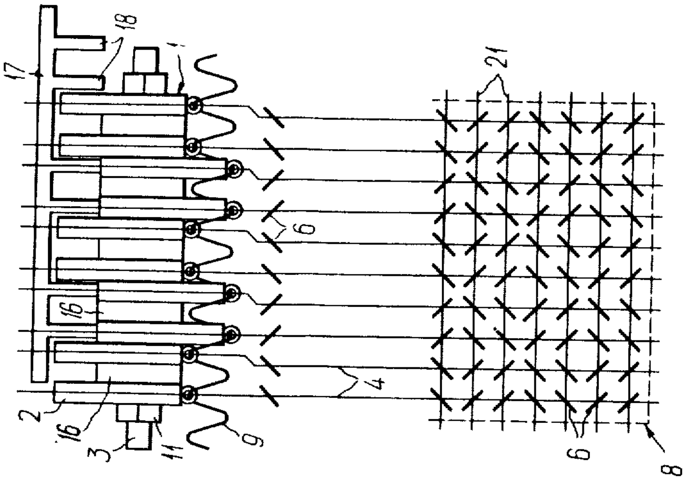
FIG. 5 illustrates yet still another embodiment of said mechanism incorporating a comb to fix the disks eccentrically to the shaft central rod according to the invention.

The disks 2 (FIG. 6), due to their holes being made as the guide slot 19, are free to move across the central rod 3 of the shaft 1 (FIG. 5) without rotating about said rod 3 (FIG. 6) due to provision of the flats 20 on the rod 3 of the shaft 1 (FIG. 5).

The disks 2 are fitted onto the central rod 3 and interlaid with the spacers 16 in such a manner that every two disks 2 alternate with one spacer 16, as is seen from the drawing. The comb 17, for performing such a topological pattern, has the teeth 18 spaced at the alternating intervals equal to the double thickness of the disk 2 and to the fourfold thickness thereof. The teeth 18 of the comb 17 advance the magnetic cores 6 into the second line on the two disks 2 alternating with the spacer 16, while the next two disks 2 alternating with the spacer 16 remain in the initial position, i.e. forced against the central rod 3 of the shaft 1, by virtue of the tension of the wires 4, towards the comb 17.

In the case of performing the topological pattern "double star," after interweaving two lines of the matrix, the comb 17 (FIG. 5) is traversed along the shaft 1 to the position wherein the disks 2 alternating with the spacer 16 and previously resting upon the teeth 18 of the comb 17 are released, while the disks 2 that, have been free during the interweaving of the preceding line, rest upon the teeth 18 of the comb 17. Thereupon, two next lines are interwoven when the disks 2 are arranged as described above. Further on, the process is repeated, alternating the position of the comb 17 after interweaving every pair of the lines.

Figures 8A, 8B, 8C, 8D, 8E, 8F:
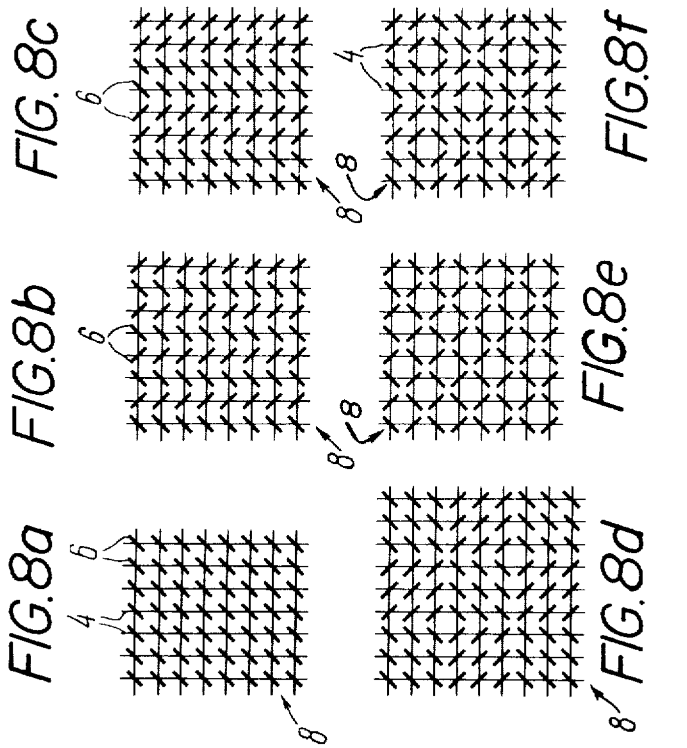
FIGS. 8(*a*) through 8(*f*) illustrate some exemplary topological patterns of memory matrices, made according to the invention.

The next two topological patterns (FIGS. 8*c* and *f*) can be performed without the use of the comb 17 (FIG. 5) but using the rigidly interconnected disks 2 of the shaft 1 featuring the same arrangement of the spacers 16 and the eccentrically situated disks 2. In a similar manner, the previously considered topological patterns of the matrices 8 can be performed without the use of the rigidly interconnected disks 2 of the shaft 1, but using the specially selected comb 17 with the teeth 18 spaced equally apart at an interval equal to the double thickness of the disk 2.

the topological pattern shown in FIG. 8d is performed by assembling the shaft 1 (FIG. 1) from the clusters of the three disks 2 interlaid with the two spacers 16 (FIG. 5). The comb suitable for the purpose, is to be made appropriately.

Figure 7:
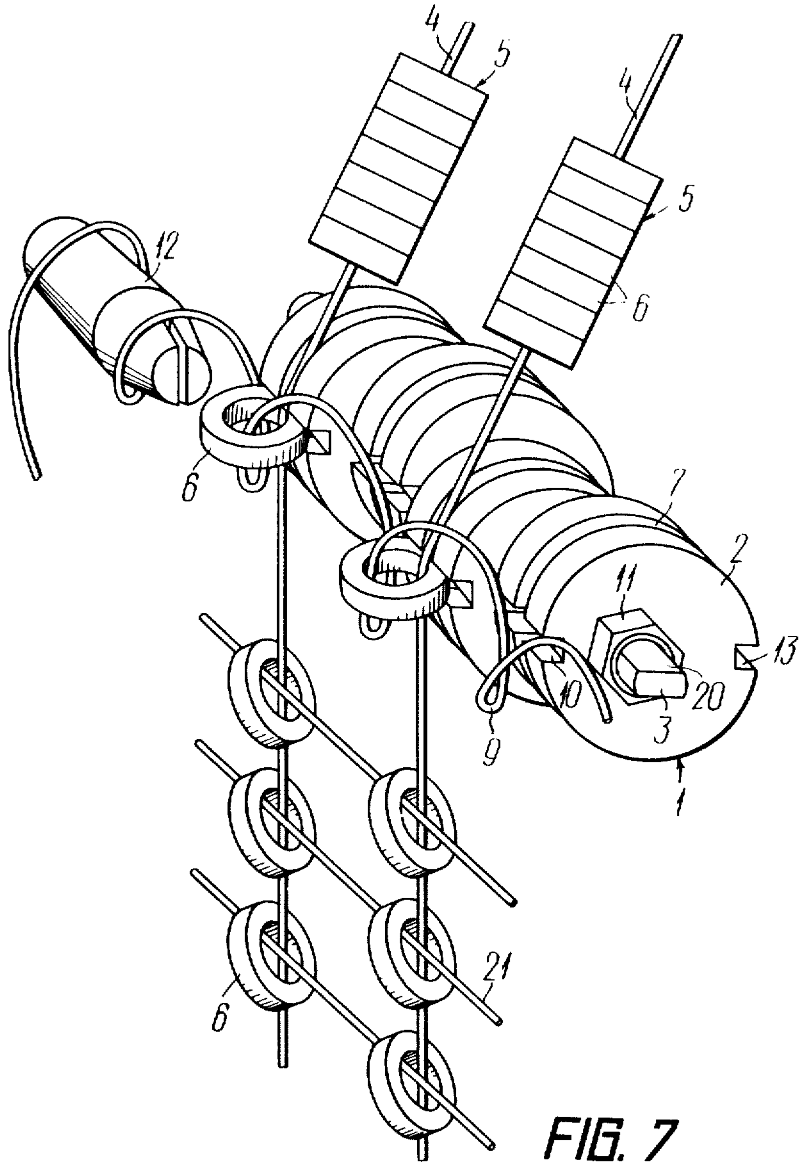
FIG. 7 illustrates one more variant of utilization of the claimed mechanism, according to the invention.

To perform the most common topological pattern (FIG. 8*a*) of the matrix 8, wherein all the magnetic cores 6 (FIG. 7) are turned to the same direction, i.e,, with all the magnetic cores 6 arranged obliquely in the same direction, the shaft 1 is composed of the disks 2 alternating with respect to their eccentricity, while the wires 4 carrying the magnetic cores 6 strung in piles thereon are placed into the recesses 7 of the disks 2 having the same eccentricity; i.e., every other disk 2.

The interweaving process occurs in a similar manner to that described above.

With the wires 4 arranged insuch a way, there can be performed the topological pattern called the "fir-tree" similar to that shown in FIG. 8*b*, but as it were turned through 90° in the plane of the drawing. To this end, after every interwoven line, the row of the seats 10 (FIG. 7) is changed, as seen from the drawing, for a diametrically opposite row of the additional seats 13, or the coil-forming mechanism 12 is displaced by a length equal to the diameter of the coil 9 of the wire in the direction away from the shaft 1.

In a similar way can be performed the "double firtree" topological pattern the same as shown in FIG. 8*c*, but also turned through 90° in the plane of the drawing.

It should be understood, however, that manipulating the set of the disks 2, using a diversity of distribution of the spacers 16 interlaid therebetween and of alternation of the rows of the seats 10 and 13, a number of the diverse other matrices 8 may be performed whose topological patterns are desired which are not disclosed in this specification.

The invention makes is possible to mechanize and automate the interweaving of the high-capacity memory matrices using highly miniaturized cores, featuring a simplified setting procedure of the mechanism for making a variety of topological patterns of the cores in memory matrices, while some of the topological patterns can be made without any setting operations whatever, which much extends the functional capacity of the mechanism and makes it standard.

The invention ensures also a considerable simplification of the design of the mechanism for feeding and fixing magnetic cores, as well as its setup and repair, makes it possible to adjust the shaft that sets out the cores for interweaving in two lines, for the coil diameter of the interweaving wire, and increases the performance characteristics of the interweaving device.

We claim:

1. A device for interweaving memory matrices with a wire wound in a coil, comprising: a bed arranged for receiving a row of wires having magnetic cores strung in piles thereon, with the wire wound in a coil being adapted for the magnetic cores to be interwoven with it; means for threading the cores with the wire wound in a coil and a mechanism for feeding and fixing the magnetic cores, the mechanism including a shaft, said shaft being made up by disks; recesses provided in said disks for accommodating therein the wires having the magnetic cores strung in piles thereon; each of said disks having a thickness equal to half a lead of the coil into which the interweaving wire is wound and at least one seat to catch the magnetic cores associated with each of said disks such that the centers of all the magnetic cores being accommodated in said seats at one time are exposed and coplanar.

2. A mechanism as claimed in claim 1, wherein the shaft has a central rod and wherein at least some of said disks are arranged eccentrically on the central rod, the amount of eccentricity being equal to half the diameter of the coil into which the interweaving wire is coiled.

3. A mechanism as claimed in claim 1, wherein an additional seat in each of said disks for catching the magnetic cores is located on the side of said disk diametrically opposite to said seat for catching said magnetic cores.

4. A mechanism as claimed in claim 1, wherein said seats for catching the magnetic cores are arranged in the direction of the axis of rotation of said disks.

5. A mechanism as claimed in claim 3, wherein said seats and the additional seats for catching said magnetic cores are arranged in the direction of the axis of rotation of said disks.

6. A mechanism as claimed in claim 3, wherein at least one of said diametrically opposite seats of said disk makes an angle with the axis of said disks, which angle is equal to the helix angle of the coil into which the interweaving wire is coiled.

7. A mechanism as claimed in claim 2, wherein said central rod of said shaft makes an angle with said axis of rotation of each of said disks, which angle is equal to the helix angle of the coil into which the interweaving wire is coiled.

8. A mechanism as claimed in claim 1, wherein provision is made for spacers interposed between some of said disks, the thickness of said spacers being equal to half the lead of the coil into which the interweaving wire is coiled.

9. A mechanism as claimed in claim 2, wherein said disks are mounted movably in the direction perpendicular to said central rod of said shaft the mechanism further including a comb located in close proximity to said shaft, the teeth of said comb being arranged in opposition to some predetermined disks to keep them eccentric with respect to said central rod of said shaft.

* * * * *